United States Patent [19]

Svehaug

[11] 4,347,134
[45] Aug. 31, 1982

[54] SLURRY SEPARATOR HAVING REACTION NOZZLE DRIVEN ROTORY BLADES WIPING A CONICAL FILTER

[76] Inventor: Oswald C. Svehaug, 114 SW. 5th, Milton-Freewater, Oreg. 97862

[21] Appl. No.: 298,858

[22] Filed: Sep. 3, 1981

[51] Int. Cl.³ .......................... C02C 1/22; B01D 29/26
[52] U.S. Cl. ..................................... 210/147; 210/298; 210/332; 210/335; 210/350; 210/355; 210/405; 210/414; 210/415; 100/90; 100/117; 100/148
[58] Field of Search ............... 210/147, 298, 332, 335, 210/350, 351, 352, 355, 405, 408, 413, 414, 415, 431, 497.3; 100/70 R, 90, 117, 138, 145–150

[56] References Cited

U.S. PATENT DOCUMENTS

| 624,580 | 5/1899 | Tousey | 210/355 |
|---|---|---|---|
| 1,443,918 | 1/1923 | King | 210/408 |
| 1,534,278 | 4/1925 | Lumpp | 210/147 |
| 1,993,214 | 3/1935 | Hass | 210/415 |
| 2,946,444 | 7/1960 | Zievers et al. | 210/408 |
| 3,849,247 | 11/1974 | Richter | 210/415 X |

FOREIGN PATENT DOCUMENTS 674762 8/1979 U.S.S.R. ............................. 210/355

*Primary Examiner*—David R. Sadowski
*Attorney, Agent, or Firm*—Charmasson, Branscomb & Holz

[57] ABSTRACT

A slurry separator utilizes the power inherent in the pressurized slurry from the slurry pump through a reaction nozzle to drive a rotor, with the slurry distributed through the nozzle being distributed over the surface of a conical grid. The rotor structure also drives squeegee-like blades which scrape the solids downward inside the cone readying screen for the next discharge, and then sweeping them down into a cylindrical auger chamber where they are compacted downwardly against an inverted conical floor to further squeeze moisture through the sides of a housing cylinder. The conical floor of the compacting cylinder presses up against the particulates to be compacted with a resistance that is proportional to the speed of the rotor, achieved through the use of a centrifugal governor. This action makes it tolerant to variations in nozzle flow volume (pressure) and converts energy output into optimum separation.

4 Claims, 13 Drawing Figures

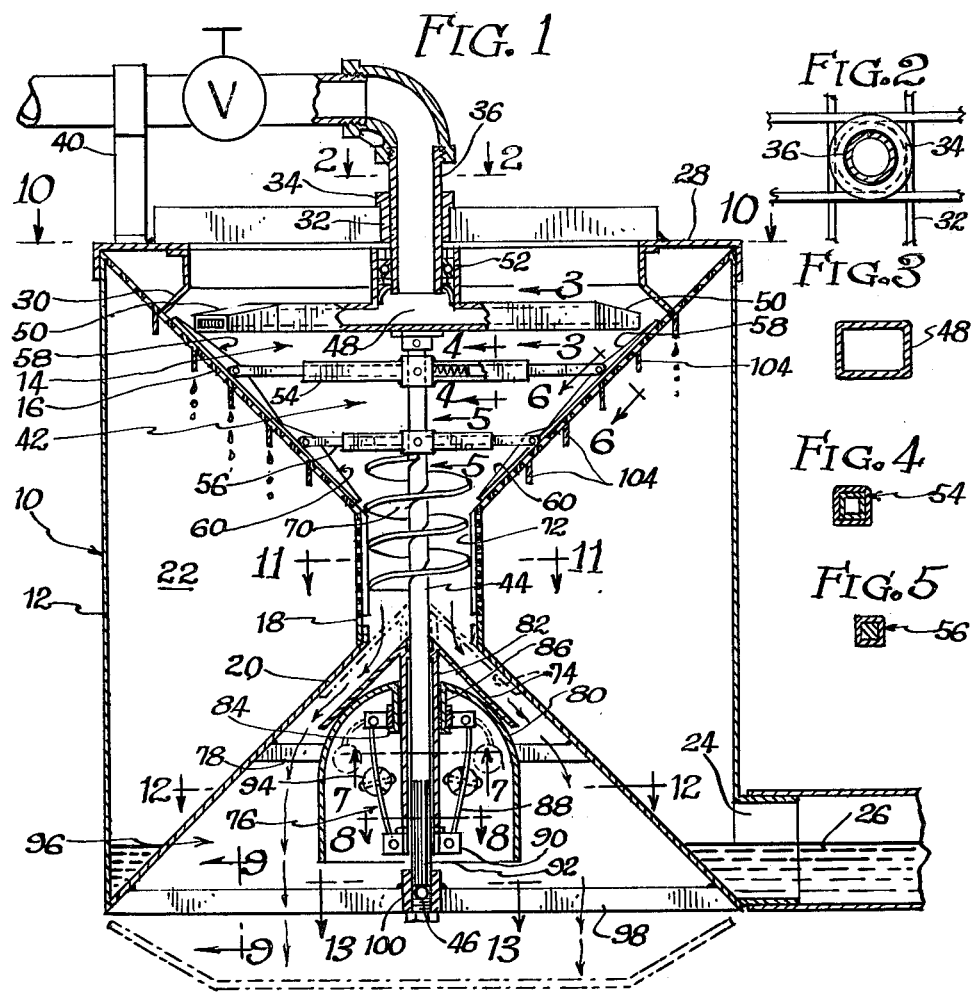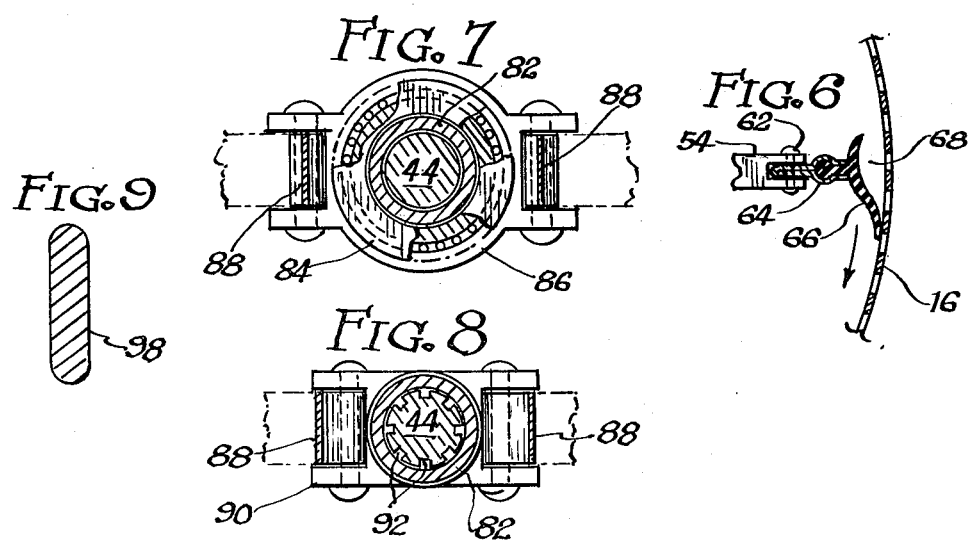

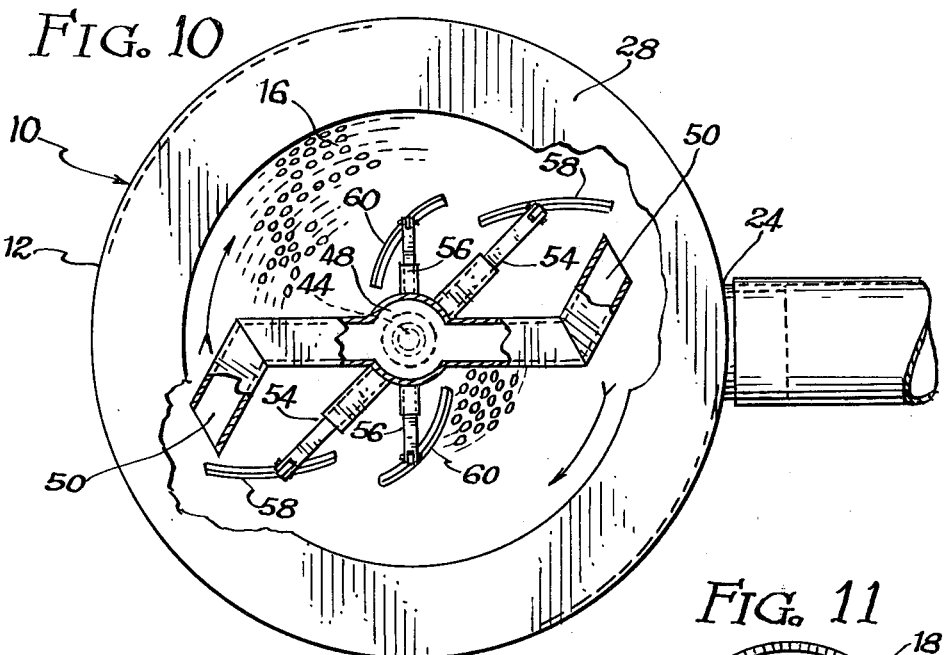
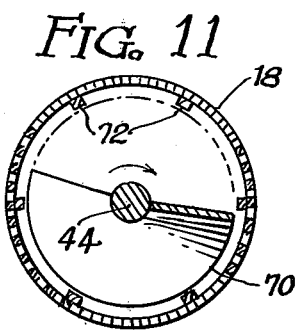
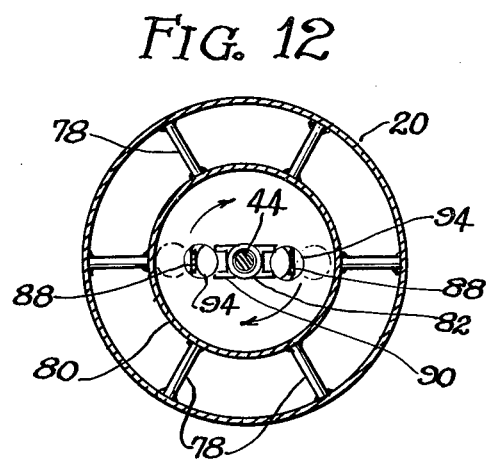
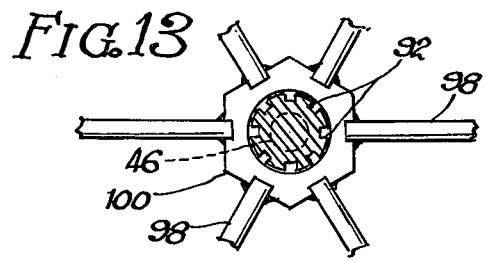

1

SLURRY SEPARATOR HAVING REACTION NOZZLE DRIVEN ROTORY BLADES WIPING A CONICAL FILTER

BACKGROUND OF THE INVENTION

There are many types of slurrys, and many other processes which utilize separators, both centrifugal and grid type. Slurrys differ so vastly in their nature that a slurry separator which is quite effective for one type of slurry might be completely inappropriate for use with another.

The slurry separator to which this disclosure pertains may have a wide variety of uses, and the description of its applications is not intended to be limiting. However, this separator is directed toward a specific problem of farmers.

On farms, in livestock barns and stables, often both liquid and solid wastes from the animals as well as loose straw is hosed along the concrete floor to a central drain where it is emptied into a lagoon or into a holding tank.

The farmers would like to recycle the liquid, which is rich in nutrients, through their irrigation lines and either refeed the solids or use them for bedding or for some other purpose. However, to date there is no effective slurry separator to make this possible.

SUMMARY OF THE INVENTION

The separator disclosed and claimed herein has a fixed structure having a generally hourglass-shaped interior compartment, the upper portions of which have perforated walls.

A rotor structure revolves inside the interior compartment and is fed the slurry from a coaxial pipe from above. This slurry is directed through radial, angulated nozzles which throw it onto the upper edge of the cone-shaped interior compartment. At the same time, the reactive force from the nozzle causes the rotor to rotate.

A number of spring-loaded wiper blades project from the rotor and are arranged to sequentially sweep the solid portion of the slurry around the cone and downward, while squeegeeing out the water through the holes in the perforated cone.

The rotor includes a coaxial shaft which passes down through the narrow portion of the hourglass and mounts an auger which compresses downwardly solid material it receives from the wiper blades. This portion of the open part of the hourglass defines a compactor cylinder and is also perforated so that as the material is compressed, moisture is further squeezed from the solids.

At the bottom of the compactor container is a conical floor which is biased upwardly to cooperate with the auger to compact solids. Ideally, the bottom is mounted on a centrifugal governor device which compresses the compactor cylinder floor upwardly with greater force as rotor speed increases, which has the effect both of limiting the speed of the rotor and utilizing any excess energy from the slurry driven by the slurry pump to automatically further compact solid matter from the slurry.

BRIEF DESCRIPTION OF THE DRAWINGS

FIG. 1 is a vertical section taken through the separator;

FIGS. 2 through 13 are sections taken along the respective section lines in FIG. 1 as indicated.

DETAILED DESCRIPTION OF THE PREFERRED EMBODIMENT

The invention includes a fixed frame 10 having an outer cylindrical wall 12 and an inner chamber 14 which is hourglass-shaped and formed from an upper cone-shaped grid 16, which could be either perforated sheet stock or screen material, a central compacting cylinder 18 which is also perforated, and a lower cone 20. An annular or sleeve-shaped space 22 receives moisture squeezed out of the slurry and runs out through outlet port 24. The moisture, indicated at 26 drips through the perforated cone and cylinder 16 and 18, and rolls off the upper surface of the lower cone 20.

The outer cylinder 12 together with the inner chamber-defining structure are covered at the top with a top ring 28 joined to an interior fairing 30. The cover could extend across the top of the fixed frame, but in the illustrated embodiment there are cross supports 32 that extend across the open central area defined by the annular cover and support a collar 34 which in turn supports slurry delivery pipe 36. This slurry pipe is fed by slurry supply line 38, which is valved and supported on a brace 40 which is mounted on the annular top of the unit.

Mounted within the central chamber is a rotor structure 42 having a central shaft 44 extending the substantial length of the rotor and supporting the weight of the rotor, or the bulk of the weight, on lower bearing 46.

At the top end of the shaft is a manifold 48 which mounts a pair of nozzles 50 so directed to provide a thrusting force in the direction of the arrows in FIG. 10 when the device is operational. The manifold has a sealed rotary joint 52 which accepts the slurry, which is under some force as it is provided by a slurry pump, which is not shown in the drawings.

Beneath the nozzle manifold are mounted four spring-loaded radial arms 54 and 56 defining upper and lower pairs respectively. These arms mount wiper blades 58 and 60, best seen in FIG. 10. The rectangular cross sections of the radial arms as indicated in FIGS. 3 through 5 prevent rotation around the axis of the respective arm, and articulated on the end of each arm, the respective wiper blade freely follows the contour of the cone grid 16.

The blades themselves are detailed in FIG. 6. The articulated joint is shown at 62, in which a bracket 64 holds the resilient blade element 66. The blade element has an extended forward tip and defines a hollow space 68 behind it to cause a cavitation effect, seen in FIG. 6, so that the grid tends to "unblind", or clear itself, with air while the machine rotates. As can be seen in FIG. 10, the arrangement of the curved blades is such that the upper blades sweep solid slurry material in the clockwise direction and down toward the bottom of the funnel with the lower blades picking up the trail of solids left by the lower tip of the upper blade.

Beneath the blade elements and their supporting arms is a large auger 70. This auger is operative in the compactor cylinder 18, which has a series of longitudinally extended strips or lands 72 which cause some resistance to the rotation of the solids in the auger so they don't simply continue to rotate in an aimless fashion, without being forced downwardly.

At the bottom of the compactor cylinder is a floor cone 74. It is desirable that the floor cone be movable away from the bottom of the cylinder to permit the passage of solids into the lower area defined by the inverted cone 20. The cone could thus be spring-loaded. However, an even better scheme utilizes a governor mechanism 76.

The governor mechanism has a frame consisting of radial struts 78 mounting a central dome 80. This dome is fixed, and permits the sliding therethrough of the sleeve 82 which mounts the conical compactor floor. The dome has an integral central portion which extends down along the sleeve 82 and defines a lower flange 84 which supports a ring bearing 86, which rotates on top of the flange but does not move up or down. This bearing provides the upper articulation for a pair of spring steel bands 88 which connect to a lower spline ring 90 which cooperates with splines 92 defined in the lower end of the rotor shaft. Ball weights 94 are rotated by the rotor shaft through the spline action, causing them to exert a centrifugal force on the steel bands 88, drawing the spline ring up and and taking the compactor floor sleeve with it. This, of course, forces the floor into position as shown in phantom in FIG. 1.

As indicated in solid line in FIG. 1, prior to the initiation of motion of the central rotor structure, the conical floor is clear of the bottom of the compactor cylinder so that no unnecessary resistance is produced to hamper initiation of rotor motion. As speed picks up, the conical floor rises until the upwardly biasing force matches the downward force of the auger. The greater the upward force of the conical floor the more resistance is offered to rotor motion, so that an automatic governor effect is provided preventing excessive speeds and at the same time insuring that maximum compacting and squeezing action is produced for the solids at the auger and no energy produced by the slurry pump is wasted.

As the solids fall into the lower chute or chamber 96 defined by the lower cone 20, they pass over a spider support 98 which supports bearing cup 100, best shown in FIG. 13. It then passes down into a trough, chute or conveyor indicated in phantom in FIG. 1 where it is taken away and stored or utilized as dry matter. One further feature of the invention are the drip generators 104 in the form of rings around the underside of the grid cone 16 which tend to break up the surface effect on the underside of the cone and cause dripping to occur without running down the entire cone to the compactor cylinder.

As described and claimed, the invention utilizes no excess energy, and is driven by the slurry pump alone, which must be used anyway. Maintenance should involve no more than periodic flushing of the system with water, and the simple mechanism should operate indefinitely.

While I have described the preferred embodiment of the invention, other embodiments may be devised and different uses may be achieved without departing from the spirit and scope of the appended claims.

What is claimed is:

1. A separator for separating a mixture of liquids and solids delivered under pressure to the separator as a slurry, said separator comprising:
    (a) a stationary frame defining an upwardly open perforated conical grid, which is generally symmetrical about a vertical central axis;
    (b) a rotor structure on a vertical axis freely rotatably mounted coaxially with said central axis inside said stationary frame;
    (c) said rotor structure including a nozzle angularly directed with respect to a radial direction from said vertical axis spaced from and directed toward said grid, said nozzle having means to supply same with pressurized slurry and directed such that slurry forced through said nozzle causes said rotary structure to rotate; and
    (d) a plurality of wiper blades, some of which are circumferentially staggered and axially overlapping with respect to others supported on said rotary structure and held against the surface of said grid such that as said frame rotates said wiper squeegees across said grid to press liquid through said grid, with said blades being angled such that axially upstream blades squeegee slurry downward and into the paths of more downstream blades to cause a continuous progressive squeegee action in the downward direction.

2. Structure according to claim 1 wherein said plurality of wiper blades are spring-loaded and are mounted on telescoping arms extending out from a central rotor shaft coaxial with the rotor axis.

3. Structure according to claim 1 wherein said conical grid converges at the bottom into the upper rim of an upright cylinder, and said stationary frame includes a divergent inverted conical wall extending below said cylinder so that said stationary frame is generally hourglass shaped, said rotor structure includes a coaxial rotor shaft passing through said cylinder having an auger mounted thereon directed to drive solids downwardly as said rotor rotates, and including a solids receiving area defined by said inverted conical wall beneath said auger and cylinder and further including an inverted conical floor for said cylinder which is displaceable downwardly away from said cylinder to pass solids, and generally parallel to and spaced from said inverted conical wall and including means biasing said floor upwardly when said rotor rotates to cause said solids to be compressed by said auger and between said floor and inverted conical wall prior to entry into said receiving area.

4. Structure according to claim 3 wherein said biasing means comprises a centrifugal governor operatively connected to said conical floor and being driven by said shaft to bias said floor upwardly into closer proximity with said inverted conical wall as a function of shaft speed.

* * * * *